United States Patent
Agatone et al.

(10) Patent No.: US 6,249,821 B1
(45) Date of Patent: Jun. 19, 2001

(54) NETWORK OBJECT FRAMEWORKS

(75) Inventors: Kevin Agatone, Broomall, PA (US); Roman Orzol, Marlton; Tim Deppa, Cherry Hill, both of NJ (US); Jon Hopkins, Brookfield, WI (US); Ponna Arumgam, Medford, NJ (US)

(73) Assignee: Oki Data Americas, Inc., Mt. Laurel, NJ (US)

( * ) Notice: Subject to any disclaimer, the term of this patent is extended or adjusted under 35 U.S.C. 154(b) by 0 days.

(21) Appl. No.: 08/666,706

(22) Filed: Jun. 18, 1996

Related U.S. Application Data

(60) Provisional application No. 60/001,170, filed on Jul. 14, 1995.

(51) Int. Cl.$^7$ .............................. G06F 9/00; G06F 9/46; G06F 15/163
(52) U.S. Cl. ............................ 709/316; 709/328
(58) Field of Search .................. 395/683, 200.1, 395/114, 309; 709/300, 301, 303, 310–332, 230

(56) References Cited

U.S. PATENT DOCUMENTS

| | | | |
|---|---|---|---|
| 5,265,239 | * | 11/1993 | Ardolino ........................... 709/217 |
| 5,396,626 | * | 3/1995 | Nguyen ............................ 364/280 |
| 5,414,812 | * | 5/1995 | Filip et al. ....................... 709/200 |
| 5,509,123 | * | 4/1996 | Dobbins et al. .................. 709/243 |
| 5,548,723 | * | 8/1996 | Pettus ............................. 395/200.01 |
| 5,566,278 | * | 10/1996 | Patel et al. ....................... 395/114 |
| 5,647,056 | * | 7/1997 | Barrett et al. .................... 395/200.1 |
| 5,754,747 | * | 5/1998 | Reilly et al. ..................... 395/114 |
| 5,826,085 | * | 10/1998 | Bennett et al. ................... 709/303 |
| 5,828,855 | * | 2/1994 | Walker . | |
| 5,938,733 | * | 8/1999 | Heimsoth et al. ................ 709/230 |

OTHER PUBLICATIONS

King, Adrian, Inside to Windows 95; Chap 9, 1994.*

* cited by examiner

*Primary Examiner*—Majid A. Banankhah
*Assistant Examiner*—P. G. Caldwell
(74) *Attorney, Agent, or Firm*—Akin, Gump, Strauss, Hauer & Feld, L.L.P.

(57) ABSTRACT

A computer network is disclosed as including at least one network client memory, a network operating system executing in the network client memory for operating the computer network and for providing access to network services, and a network application executing in the network client memory for performing an application function. The computer network also has a plurality of network devices interfaced to the network operating system and available to the network application and the network operating system for performing the network services. Each network device provides at least one specific network service and has an object component in the network client memory representative of the network device. Each object component includes an interface such that the network application is in direct communication with the interface of each object component. Accordingly, the network application communicates directly with each of the object components. The network application need only communicate with a respective object component to request a respective network service, and the respective object component carries out all further communications necessary to have the requested network service performed.

6 Claims, 10 Drawing Sheets

NETWORK OBJECT FRAMEWORKS

This application claims benefit to provisional application Ser. No. 60/001,170 filing date Jul. 14, 1995.

FIELD OF THE INVENTION

The present invention relates to creating a network application which accesses network services provided by a network operating system. More particularly, the present invention relates to a method for maintaining communication channels between network devices to allow state information and commands to be exchanged between the devices.

BACKGROUND OF THE INVENTION

Traditionally, network application access to network services and devices during application development is obtained by way of a software developer kit. As should be understood, the kit is generally distributed by the network operating system software vendor, and typically provides functional interfaces to a network Application Programmers Interface (API). The network API provides access to each of the network services, and also provides mechanisms to create communication channels to other network devices.

Network operating systems services include but are not limited to services provided by application servers, file servers, print servers and other network management tools. Typical management operations include user account management services, file and directory management services, volume services, queuing services, print management services, and connection information services, among other things.

File management services include opening, reading from, writing to, closing, archiving, protecting, encrypting, and otherwise managing files in a multiple user environment. Print management services include generating and maintaining printer definitions, form definitions, print service definitions, and queue connection definitions; pre- and post-filter processing; and print job redirection, among other things. Such services are typically divided into working segments to allow applications to access the services in a functional manner.

For an application to access a requested service, service-related information must be retrieved from a network database, and the retrieved information is employed to access one or more network devices that provides the requested service. Such information includes all the descriptive information about each service and identifiers for addressing the network devices and services directly. However, and as should be understood, such a process is cumbersome in that the retrieval of the information and the accessing of the service require multiple requests from the application, and in that the requests must be passed through circuitous routes.

A need exists, then, for a system and method for encapsulating network service-related information and network devices such that an application can virtually communicate directly with the appropriate network device or devices that provides the requested service. As should be understood, virtual communication refers to a logical communication process rather than a physically communication process.

Virtual communication between network-attached devices is made possible by creating channels, ports, or "sockets", where each socket defines a logical connection between a first device and a second device. As should be understood by one skilled in the art, first and second devices connected by a socket can only communicate with each other by / through the socket. The same description holds true for software tasks which are communicating with each other through the network media. Tasks connected on a socket are guaranteed to send signals or messages to each other.

Messages are streams of data which are packetized in such a way that the message ends up at the right destination task and each end of the socket can decipher the information or data which is trying to be communicated. The packetized information contains identifiers and indexes which may change the state of the communication channel.

As one skilled in the art should recognize, object-oriented analysis and design (OOA&D) is an approach for classifying and describing interactions between object components, and then encapsulating and modeling such object components. Classifications are defined by generalizing object components. Object components are identified by recognizing characterizations and functions which behave as individual entities and have unique behavior and descriptive attributes. In the invention to be described below, a set of classifications, object components, and interactions between object components are defined. As seen in the drawings, the OOA&D for the present invention may be fully described though the use of classification and object component diagrams.

OOA&D object technology, object analysis, design theory, and terminology is discussed in detail in *Object-Oriented Analysis and Design with Applications*, Grady Booch, [Redwood City, Calif.: Benjamin/Cummings, 1993], hereby incorporated by reference. Because object designs build on each other (i.e. new objects are generally built from older objects), several class libraries are available for starting a new analysis and design. The object design of the present invention builds on the Rogue Wave Foundation Class Libraries, TOOLS.H++. As should be understood, TOOLS.H++ has classifications for objects such as strings, multi-byte strings, localized time and date, hash sets, binary trees, dictionaries, sorted lists, linked lists, etc.

The model-view-controller (MVC) architecture is a useful architectures used by OOA&D applications. The MVC is essentially a trinity of objects and classifications which facilitates the physical data collection (model), the expression or composition of the data presentation (view), and the interaction or interface between the presentation and the user or outside influence (controller).

Models are the physical data collection or content of the physical devices and the behavior or the devices as described by the system make up the objects. Each model keeps track of the raw data which may or may not be understandable to the user or outside influence. Views are the objects which interact directly with the models and whose primary purpose is to shape or present the model raw data. Each model may contain several view instances and each view may only exist for one model.

Each view instance may present the model in different ways or may only present sections or subsections or information about the model. The view can also write information into the model as raw data. In the implementation of the MVC, raw information is periodically collected by the model if at least one view exists for such model. A reference is registered with a model for every view created for the model. When a view is destroyed, the respective reference is released by the respective model.

The models and views are manipulated and processed with the actions of controller objects (also referred to as user interface objects). The controller objects cause methods of a view to be invoked which in turn may cause reactions in a related model. Accordingly, controller objects tend to cause the MVC architecture to be highly event-driven. Therefore, event-driven operating systems such as the MICROSOFT WINDOWS operating system from MICROSOFT Corporation allow for a clean existence of an MVC architecture.

SUMMARY OF THE INVENTION

Briefly stated, in the preferred embodiment of the present invention, a computer network includes at least one network client memory, a network operating system executing in the network client memory for operating the computer network and for providing access to network services, and a network application executing in the network client memory for performing an application function. The computer network also has a plurality of network devices interfaced to the network operating system and available to the network application and the network operating system for performing the network services.

Each network device provides at least one specific network service and has an object component in the network client memory representative of the network device. Each object component includes an interface such that the network application is in direct communication with the interface of each object component. Accordingly, the network application can communicate directly with each of the object components. The network application need only communicate with a respective object component to request a respective network service, and the respective object component carries out all further communications necessary to have the requested network service performed.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements, configurations and instrumentalities shown. In the drawings.

DETAILED DESCRIPTION OF PREFERRED EMBODIMENTS

The preferred embodiment of the present invention is generated in a computer network environment characterized by a network operating system 11 to provide network object frameworks. The preferred embodiment is described in terms of classifications that are discovered. For many of the classifications, a description of the responsibilities and collaborations is provided. Methods needed for descriptive purposes are listed where necessary for understanding the classification. Not all classifications which make up the final implementation of the preferred embodiment are described here, since some exist from outside class libraries, such as the RogueWave TOOLS.H++ class library, and some exist as instantiated classifications or parameterized classes which behavior is self evident.

Figure 1:
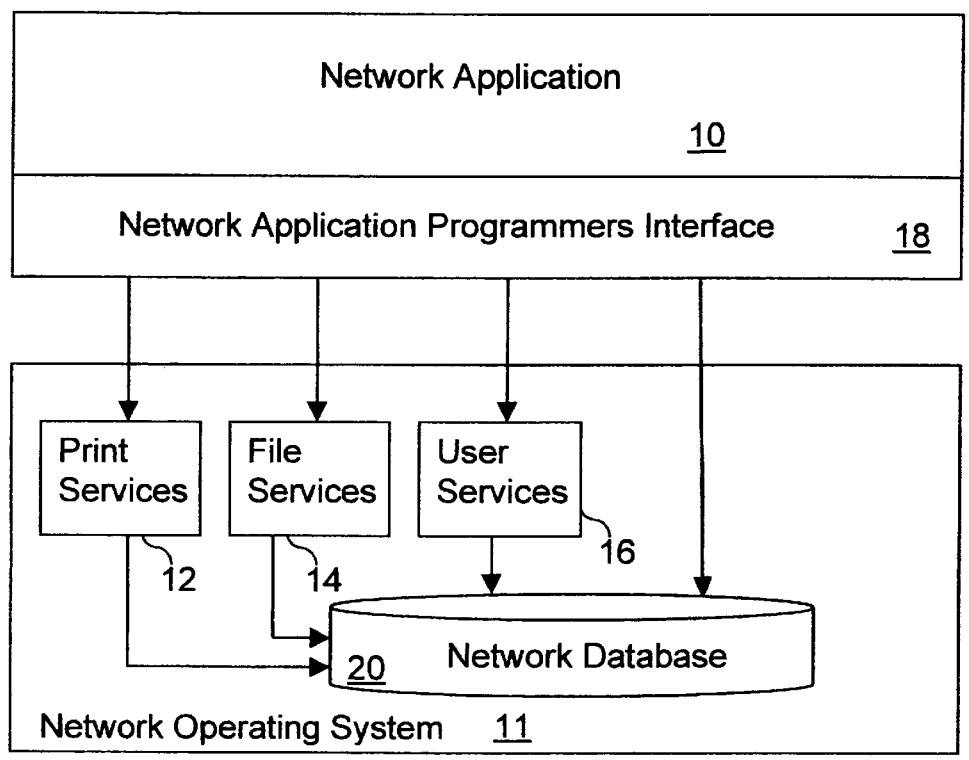
FIGS. 1 and 3 are schematic block diagrams showing the prior art structure and methodology, respectively, by which a network application or task communicates with service-providing network devices by way of indirect communications channels.

Referring now to the drawings in detail, there is shown in FIG. 1 a prior art structure employed by a network application 10 to access network services include a print services device 12, a file services device 14, and a user services device 16. As seen, the application 10 communicates with all services through an application programmers interface (API) 18. Access to the API 18 is provided by the network vendor through a software development kit (SDK) provided by the vendor. Each service is accessed indirectly through the API 18.

In order for the application 10 to discover information about available services or devices in service by the network, the application 10 must first access a network database 20 indirectly through the API 18, retrieve information from the database 20, and store the retrieved information in a location local to the application 10. The application 10 then can decide how to access devices in service by the network based on the stored information. As should be understood, for each device accessed, the application 10 must make separate calls to the database 20 and must store separate pieces of information locally.

For example, an application 10 that requires access to a print server must retrieve the name of a print services device 12 and the location of the print services device 12 from the network database 20. Separate pieces of information concerning how to address the print services device 12 must also be retrieved. The application 10 can then make function calls by way of the API 18 using the retrieved information to access information from the print services device 12. If the application 10 makes changes to the print services device 12, the changes must be stored in the network database 20 by way of the API 18. As should be understood, the application 10 accesses and changes a file services device 14, and a user services device 16 in a similar manner.

Figure 2:
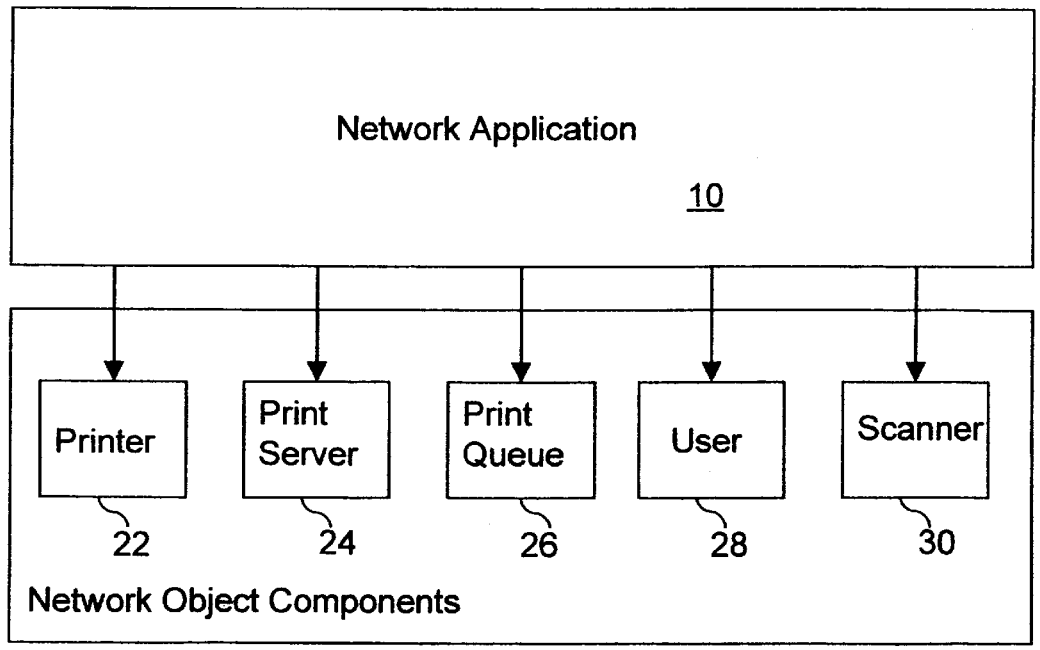
FIGS. 2 and 4 are schematic block diagrams showing the structure and methodology, respectively, by which a network application or task virtually communicates directly with service-providing network object components in accordance with a preferred embodiment of the present invention.

FIG. 2 shows a network objects framework in accordance with a preferred embodiment of the present invention. As seen, the framework concerns the interface between the network application 10 and network objects 22, 24, 26, 28, 30. Contrary to the application 10 shown in FIG. 1, the application 10 shown in FIG. 2 virtually communicates directly to the devices which mike up the network services. As seen, the network objects represent devices that include a printer 22, a print server 24, a print queue 26, a user 28, and a scanner 30, among other things, and are modeled by component objects 22, 24, 26, 28, 30. Any communication made directly to a component object 22, 24, 26, 28, 30 is like communicating directly to the device. If an API-type call to the network must be made by an application 10 to access a network device, the respective component object 22, 24, 26, 28, 30 makes the call, and returns the appropriate information to the application 10. Accordingly, network database information is maintained as data elements or characteristics of respective component objects 22, 24, 26, 28, 30.

Figure 3:
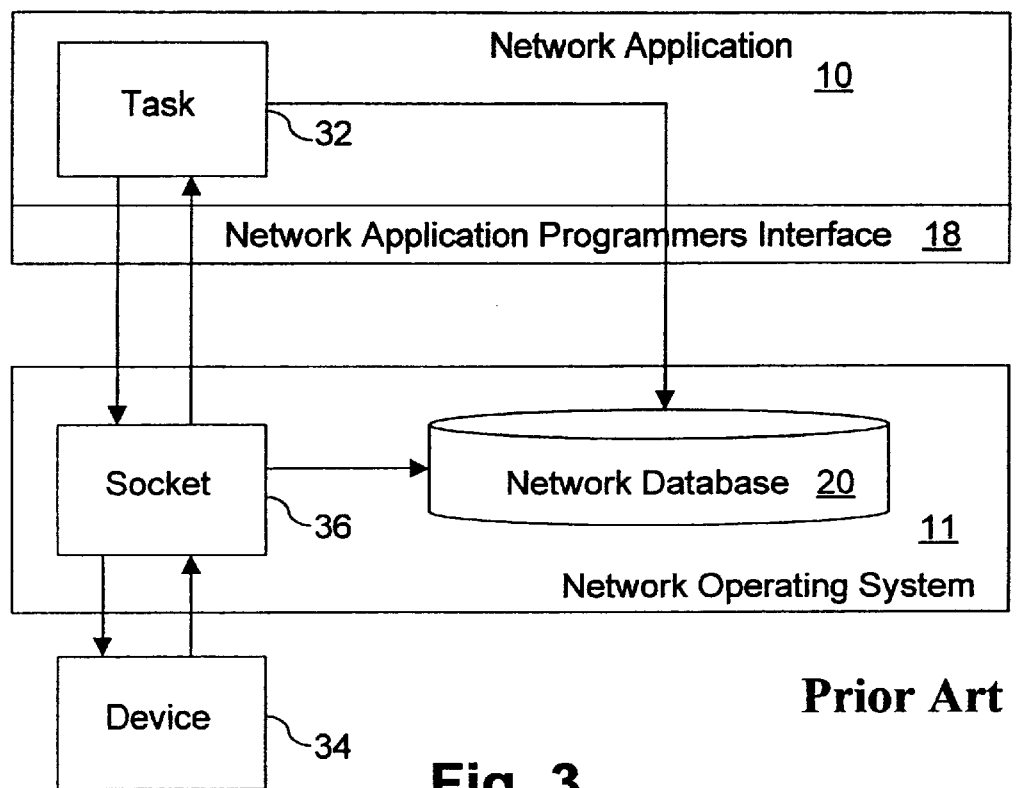

FIG. 3 shows the prior art methodology by which a task 32 of a network application 10 communicates with a network device 34. As seen, the task 32 requests database information for creating a socket to an external network device 34 by way of a network API call. With the requested information, the task 32 creates a socket 36 and then creates header and data packets which are used when communicating through the created socket 36. The packets of information are sent and received using network transmit and receive API calls, respectively.

Figure 4:
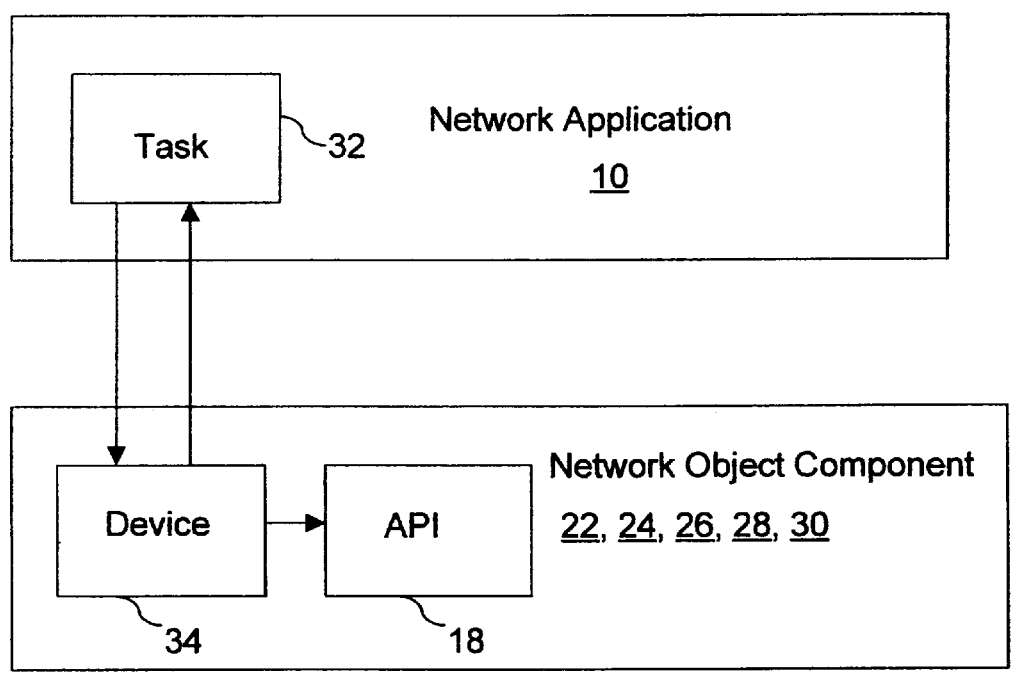

FIG. 4 shows the methodology by which the network object frameworks of the preferred embodiment of the present invention allows a task 32 of a network application 10 to virtually communicate directly with a network device 34. As seen, the network device 34 is represented as a component object 22, 24, 26, 28, 30 which models the precise behavior of the network device 34. Accordingly, the application 10 sends requests or messages directly to the component object 22, 24, 26,.28, 30, and awaits responses directly from the component object 22, 24, 26, 28, 30.

Importantly, the component object 22, 24, 26, 28, 30 includes an API or API-like portion 18, and actual communication to the network device 34 from the component object 22, 24, 26, 28, 30 is made by way of network socket API calls through the API 18 of the component object 22, 24, 26, 28, 30. Data sent to and from the device, then, is encapsulated by the component object 22, 24, 26, 28, 30, and any database information retrieved from API calls to the network database 20 is kept as data elements or characteristics of the component object 22, 24, 26, 28, 30.

Figure 5:
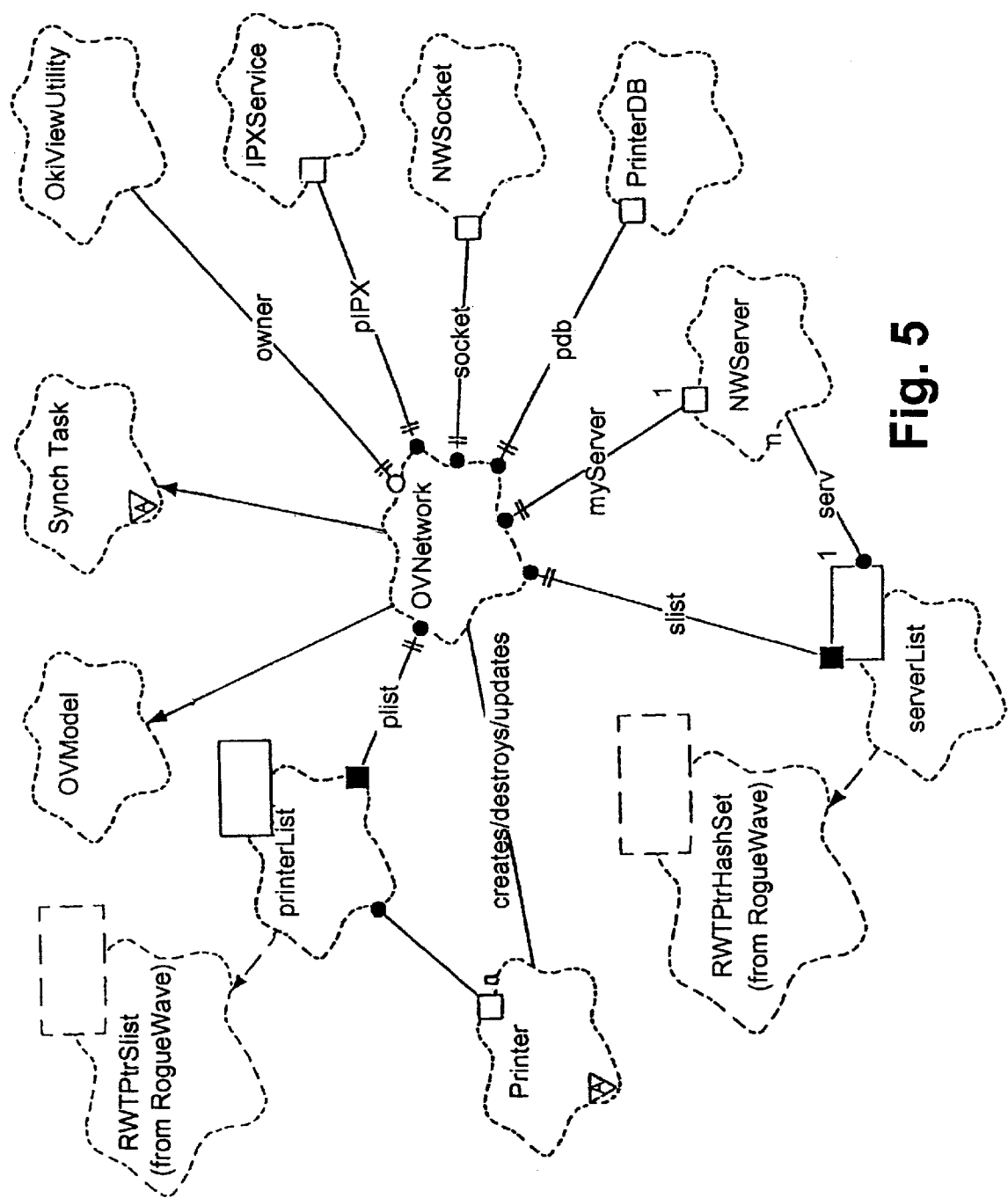
FIG. 5 is an OOA&D classification diagram showing network class relationships in accordance with the preferred embodiment of the present invention.

FIG. 5 shows a network classification scheme in accordance with a preferred embodiment of the present invention. In describing this and all other object-oriented diagrams, the Grady Booch Object-Oriented Analysis and Design (OOA&D) methodology is used. One who is practiced in the art of OOA&D will recognize and understands the terminology and the symbols used below and in the drawings. Some of the class and object names use the OVxxx prefix in order to be distinguished from other similarly named objects. Of course, one skilled in the art will recognize that the names are not intended to be limiting, and that virtually any names may be employed without departing from the spirit and scope of the present invention. The classes as they appear in FIG. 5 and their relationships will now be discussed.

OVModel—The base class model for the OkiView MVC design, which describes the base OkiView modeling schema. Such schema is very similar to the MVC architecture which is evident in a large majority of Object-Oriented designs.

Responsibilities:
1. Maintains relations between model and view (OVView, described below) for updating information.
2. Maintains a list of views which are constructed to access the model, including registering and removing views from the list.
3. Provides a synchronous method 'scan' for updating model state and information. 'Scan' provides a mechanism for inhibiting the update if no views are currently registered.

Collaborations:
1. Accesses the OVView method 'update' when the model detects that there has been a change in content or state.

OVView (not shown)—The base class view for the Oki-View MVC design.

Responsibilities:
1. Maintains relations between the view and the model monitored by the view.
2. Maintains a list of child views constructed as parts of the overall view. Each child view may have a different model from the parent view.
3. Updates any existing parent view when new information is available.
4. Provides the method 'update' for allowing new information from the model to be displayed.
5. Provides a method 'retire' that the model may invoke when being destroyed.

Collaborations:
1. A parent view works with existing child views to notify each other when new information is available.

Timer (not shown in FIG. 5, shown in FIG. 12)—This class describes an object with the ability to 'wake up' periodically, and contains a list of objects of type SynchTask. The Timer interfaces with the operating system and provides a means for callback into a Timer method. The callback traverses the list of SynchTask objects and invokes the 'TICK' method of each. A SynchTask is registered with the Timer (i.e. store a SynchTask reference in the Timer list) during the construction of a SynchTask object. The reference is cleared during the destruction of the Synchtask object.

Responsibilities:
1. Wakes up at a periodic time interval which is set when the Timer is started.
2. Maintains a list of tasks of type SynchTask. A SynchTask provides a method called TICK called by Timer during the wake up period.
3. Provides methods to start and stop the Timer.

Collaborations:
1. Maintains references to all registered SynchTask objects to invoke the TICK method.

SynchTask—This class describes a task which is capable of periodically waking up and performing a single function called TICK. Any class which inherits this capability provides the TICK function. The SynchTask object is registered with the Timer class. The Timer class creates a single instance object which knows how to utilize timers within the operating system.

Responsibilities:
1. Provides a virtual method TICK which derived classes may define to process information which must be accessed at regular intervals.
2. Provides methods to start and stop the periodic update intervals.

Collaborations:
1. Maintains a reference to the Timer to allow for the addition and removal of a SynchTask object from the Timer lists.

OkiViewUtility—This class defines ownership of all other classes. As should be understood, 'ownership' is a convenient device for an application developer since it is easier to cause an instance of an object or type OkiViewUtility than it is to create instances of all the individual classes which make up the system and store their existence within the application 10.

Responsibilities:
1. Maintains the aggregation of objects Timer and OVNetwork. Many other objects are contained as aggregations of Timer and OVNetwork.
2. Encapsulates the interface to the operating environment for accessing preference information for the operation of the objects.

Collaborations:
1. Maintains a reference to Timer for purposes of creating and destroying objects.
2. Maintains a reference to OVNetwork for purposes of creating, initializing, and destroying objects.

OVNetwork—This class contains the aggregation of all the primary classes which make up the network services, and is responsible for the creation and destruction of all such aggregate objects. OVNetwork is multiply inherited from OVModel and SynchTask. OVModel allows OVNetwork to update view classes (OVView) and maintains model behaviors. SynchTask allows OVNetwork to periodically uncover new information about the network and allows at least some of the aggregate objects to uncover their own new information. The updated information is done intelligently in that no formal operation is performed by the OVNetwork or any aggregate if there are no views registered with the model. OVModel provides the active list of registered views. An application developer may send messages to OVNetwork directly, or may request OVNetwork to send messages to an aggregate object if needed.

Responsibilities:
1. Creates IPXService to initialize access to the network API.
2. Maintains a list of NetWare server objects which are of type NWServer.
3. Encapsulates the mechanisms from the network API for updating the list of NetWare servers currently providing services on the network.
4. Maintains a socket connection for communicating between the application 10 and printer devices.
5. Provides a means to find new printer devices which exist on the network and are responsive to the predefined socket connection. This occurs during the TICK method provided by OVNetwork.
6. Provides a means to allow servers to scan for new state information. This occurs during the TICK method provided by OVNetwork.
7. Maintains a list of printer devices found on the network.

Collaborations:
1. Maintains a reference to OkiViewUtility to access preference information.
2. Maintains a reference to IPXService to access information about client station network API parameters.
3. Maintains a reference to the socket created to access information from the printer devices.

IPXService—This class provides IPX binding, initialization, and closure for the NetWare IPX API. This is an encapsulation of NetWare API function calls. Without any additional steps required by the application developer, the instantiation of IPXService provides all the necessary manipulations of the client station to start communication with the Network environment and other network devices. If need be, the application developer may then refer to IPXService for handles and other references of the client workstation and the network environment. Since the IPXService class is responsible for initializing the NetWare API, it is a single instance object. IPXService also contains a private list of IPX sockets. IPXService maintains a reference to every IPX socket, NWSocket, created by the application 10. If the application 10 destroys the socket, the reference is removed from the IPXService list. If the application 10 forgets to destroy the socket and the application 10 is closed, IPXService forces the destruction of any open sockets found in its list. Such a safety feature makes the class libraries more reliable since if a socket is not closed after an application 10 ceases to exist, unknown socket communications may render the client station useless.

Responsibilities:
1. Initializes the NetWare API.
2. Binds the application 10 to the API and retrieves the application task handle.
3. Cleans up the NetWare API during application termination and ensures that all NWSockets are destroyed appropriately.
4. Maintains a list of sockets open for an application 10.
5. Maintains the NetWare shell configuration.
6. Maintains the NetWare state.

Collaborations:
1. Maintains a reference to each NWSocket to ensure that all appropriate NetWare sockets are destroyed before an application 10 terminates.

ecb (not shown in FIG. 5, shown in FIG. 6)—This is the class form of the ECB (Event Control Block) structure, which is the mechanism used for communicating data buffers to the NetWare API, and which is defined by the API.

Responsibilities:
1. Initializes the header and data buffers.
2. Provides convenient access to data buffers and ECB state information.
3. Manipulates ECB data members.
4. Creates and destroys the physical transmit and receive data buffers.

Collaborations:
1. This class is publicly derived from the ECE structure.

NWSocket—This class is the encapsulation of IPX service socket API function calls. Such sockets are used to create communication channels between a client workstation and another network device capable of recognizing the socket identifier. An NWSocket is created with a unique identifier or ID (socketNumber) and stores as data members the information needed to communicate. IPXService provides a taskId identification to give an application 10 a hook into the NetWare socket interface. NWSocket contains aggregate objects which manage the transmission and reception of network data packet buffers. NWSocket is inherited from SynchTask and provides a TICK function which polls the API interface for received data packet buffer and re-sends data packet buffers which fail. The data packet buffers are described by the ECB structure.

Responsibilities:
1. Creates a socket using the necessary API function calls.
2. Provides necessary listen buffers to receive data packets off the network. The listen buffers are kept in a list maintained by NWSocket.
3. Determines whether an ecb has received data. The ecb gets placed on a receive list. The list is accessed by an application 10 when it is ready to process new data.
4. Allows transmission of data packets onto the network. The necessary API function calls are used to provide this responsibility.

5. Provides assistance for formatting ecb objects used for transmitting and receiving.

6. Determines a local address for a client station.

Collaborations:

1. Maintains a reference to IPXService for accessing client workstations specific to information.

2. Accesses ecb methods to determine when data is processed during a transmit, receive, or error condition.

3. Registers a reference to itself to IPXService.

NWServer—This class represents an actual NetWare Server. Information regarding handles to the server, server type, server version, etc. is retrieved and stored by the NWServer object when created. NWServer stores actual user lists and attachment information. If an application 10 has a physical attachment to a server, the NWServer creates an NWAttachment which represents all attachment information. An application 10 may also create NWAttachment for NWServer which causes the client station to physically log in to the NetWare server. NWServer also contains the list of print queues (NWQueue), print servers (NWPrintServer), and remote printers (NWPrinters) managed by the NetWare Server. An application 10 can create, destroy, or modify each of these objects which in turn causes the appropriate API calls.

NWServer also inherits OVModel, and can smartly update information on a periodic basis. The OVNetwork TICK function calls all NWServers found on the network. Physical API calls for updating information are made only if NWServer has registered views.

Responsibilities:

1. Maintains information on the connection type.

2. Creates and maintains an attachment, NWAttachment, from a workstation to the physical NetWare server, if necessary.

3. Retrieves server version information.

4. Retrieves privilege information from attachment.

5. Retrieves all user and group information defined for the NetWare server and collects information into a list.

6. Retrieves all queues, NWQueue, defined on the NetWare server and collects queues into a list, which is updated during the TICK period of OVNetwork.

7. Creates and destroys NWQueue objects as required.

8. Allows an application 10 to access the NWQueue objects stored in the lists.

9. Retrieves all print servers, NWPrintServer, defined on the NetWare server and collects print servers into a list. The list is updated during the TICK period of OVNetwork.

10. Creates and destroys NWPrintServer objects as required.

11. Allows an application 10 to access the NWPrintServer objects stored in the lists.

Collaborations:

1. If an application 10 is currently logged into a NetWare server, a reference is kept to an NWAttachment object. The application 10 may also log into and out of the server by created or destroying the NWAttachment.

serverList—This instantiated class contains a list of all NWServer objects which are discovered by the OVNetwork. The list is derived from a parameterized class which behaves like a hash set. The serverList is traversed by OVNetwork during TICK to provide each NWServer the opportunity to update its corresponding information.

Printer—This class encapsulates all transactions between a client workstation and a printer device residing on the network. An application 10 obtains information on a printer device directly from the corresponding Printer object, and changes printer device settings by accessing the Printer object. OVNetwork discovers a new printer device and creates a corresponding Printer object during the TICK function. OVNetwork also determines if printer devices disappear during the TICK time period. OVNetwork creating an NWSocket to facilitate communications between the Printer object and the physical printer device. The Printer class also inherits OVModel allowing it to retrieve information periodically and smartly, i.e. only if a view exists.

Responsibilities:

1. Maintains all statistics and state information regarding the physical printer device.

2. Monitors and controls the NetWare print server capability of the physical printer device.

3. Maintains all configuration information regarding the network interface of the physical printer object.

4. Determines whether a received printer packet is from an existing printer or a new printer. If the packet belongs to a new printer, OVNetwork is notified and a new Printer object is created.

5. Creates data packets for NWSocket to transmit to the printer or printers.

6. Determines, when called for by OVNetwork, whether a significant amount of time has lapsed for the data in the Printer to remain valid. The Printer object is destroyed if the data is no longer valid.

Collaborations:

1. Works with OVNetwork to determine the existence of new printers and to destroy printers which no longer respond.

2. Works with NWSocket to receive and transmit data packets to and from the physical printer device.

printerList—This instantiated class contains a list of all Printer objects discovered by OVNetwork. OVNetwork uses the list to allow updates during its TICK time period and provides the list to any view object. The list is derived from a parameterized class which behaves as a singly-linked list.

PrinterDB—This class is a database holding area for non-volatile information generated for past existing printer devices. Reference is made to PrinterDB for possible information needed during creation of a new Printer object.

Responsibilities:

1. Maintains all non-volatile printer configuration information. Such information includes a printer description, administrator notes, print driver distribution, and a printer location description.

2. Allows such information to be distributed to PrinterDB objects which may exist in remote applications 10 on the network.

Collaborations:

1. Works with the Printer object to determine if new information needs to be retrieved and/or saved.

Figure 6:
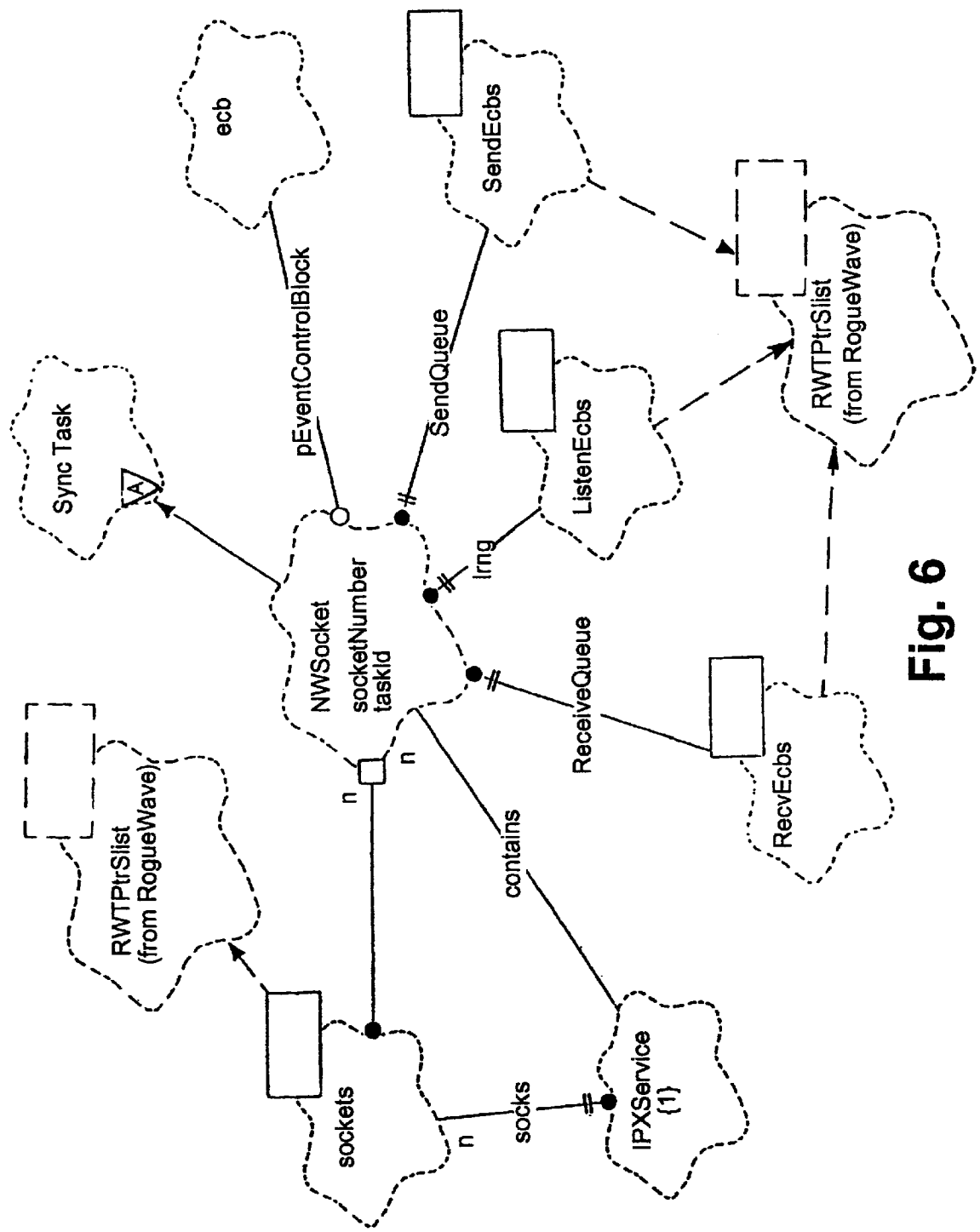
FIG. 6 is an OOA&D classification diagram showing the relationships of the network socket in accordance with the preferred embodiment of the present invention.

FIG. 6 outlines the socket implementation employed by the preferred embodiment of the present invention. In describing this diagram the Grady Booch Object-Oriented Analysis and Design methodology is used. The classes as they appear in FIG. 6 and their relationships will now be discussed.

NWSocket—As was discussed above, this class encapsulates the socket communication between a client workstation and a network device. The socketNumber provides the unique identification needed to create the object. The taskId is the identification provided by IPXService to give an application 10 a hook into the NetWare socket interface. NWSocket provides a TICK function which polls the API interface for received data packet buffer and re-sends data packet buffers which fail.

IPXService—As was discussed above, this class is a single instance object which maintains the IPX status with a client workstation. IPXService maintains a list of all existing sockets so that cleanup can occur in a safe manner.

sockets—This is the instantiated class list of NWSocket contained by IPXService. The sockets class is derived from a parameterized class which behaves like a singly-linked list.

ecb—As was discussed above, this is the classification form of the ECB structure. The ecb class is responsible for the manipulation of ECB data members and the creation and destruction of the physical transmit and receive data buffers.

SendEcbs—This is the instantiated class list of ecb objects which have been sent. The status of each sent object is checked periodically during TICK. If a status check indicates failure, the failed sent object is resent. If a status check indicates success, the successful sent object is destroyed or returned to an owner if one exists. SendEcbs is derived from a parameterized class which behaves like a singly-linked list.

ListenEcbs—This is the instantiated class list of ecb objects which are awaiting the arrival of new data packets from the network. Each listen ecb is checked for received data during TICK. If data is received, the listen ecb is sent to the RecvEcbs list (discussed below) and a new ecb is created to take its place in the ListenEcbs list. ListenEcbs is derived from a parameterized class which behaves like a singly-linked list.

RecvEcbs—This is the instantiated class list of ecb objects which have received data from the network. OVNetwork polls RecvEcbs during TICK and acts upon the data received. RecvEcbs is derived from a parameterized class which behaves like a singly-linked list.

Figure 7:
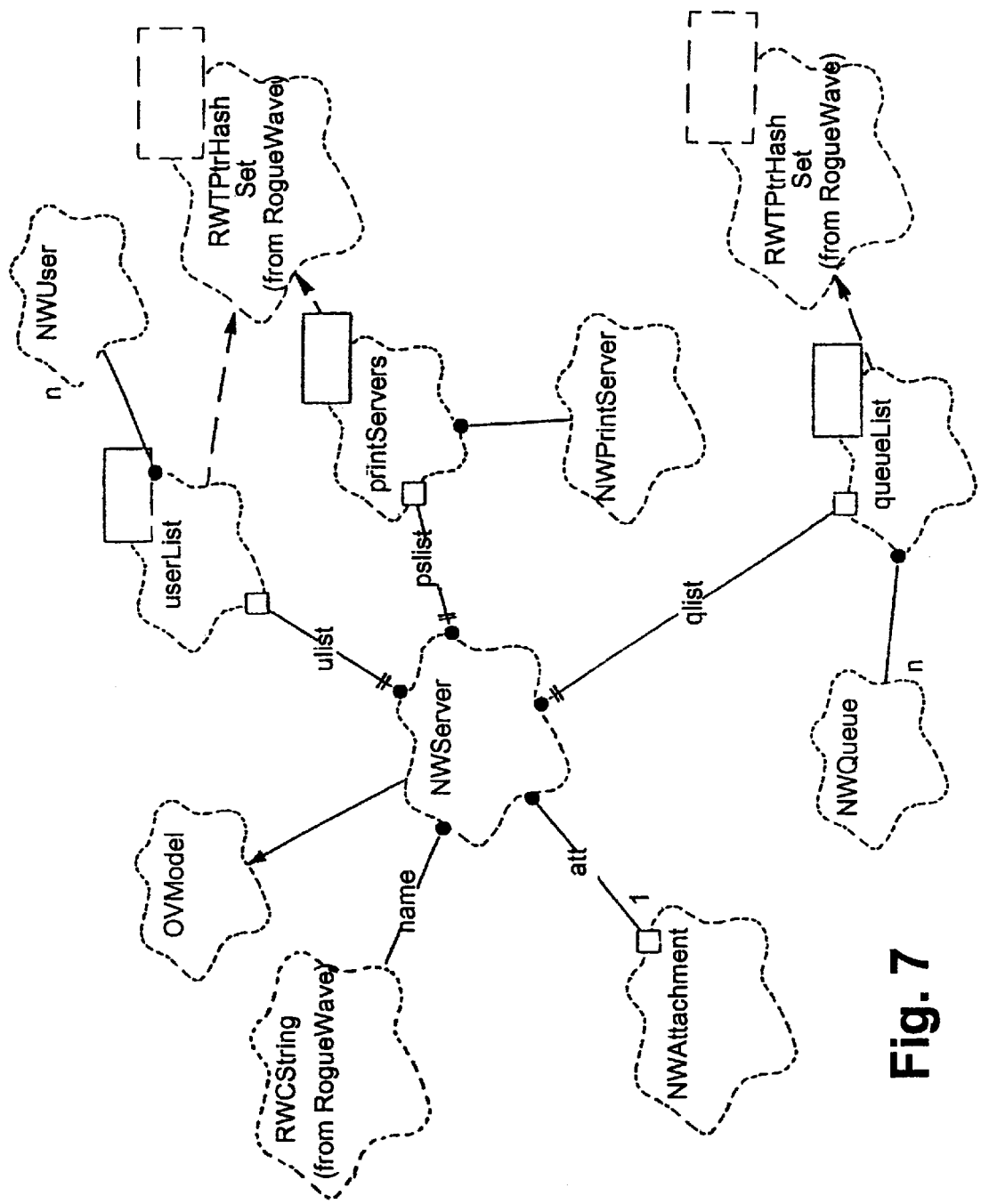
FIG. 7 is an OOA&D classification diagram showing the relationships of the server attachment in accordance with the preferred embodiment of the present invention.

FIG. 7 outlines the NWServer implementation employed by the preferred embodiment of the present invention. In describing this diagram the Grady Booch Object-Oriented Analysis and Design methodology is used. The classes as they appear in FIG. 7 and their relationships will now be discussed.

NWServer—As was discussed above, this classification represents an actual NetWare Server. The NWServer has relationships with users (NWUser), print servers (NWPrintServer), and queues (NWQueue), where each component object models the physical relationship with the NetWare server. NWServer is inherited from OVModel. Accordingly, an intelligent update capability is provided which prevents extraneous API calls from being made if no views are present.

NWUser—This classification maintains the information needed to identify a valid user on the NetWare server. A valid user may cause an attachment to the server, may provide user and operator control on NetWare queues, and may be the recipient of notification messages for NetWare print servers.

Responsibilities:
1. Maintains the user name, type (user or group), notification type, and notification interval.

Collaborations:
1. Works with NWPrinter to store notification lists.
2. Works with NWQueue to store user and operator lists.

userList—This is the instantiated class list of NWUser objects, and is employed by NWServer to maintain a valid list of server users. This class is derived from a parameterized class which behaves like a hash set.

NWPrintServer—This classification models a NetWare print server. As should be understood, a print server is responsible for connecting to a NetWare queue, acquiring a print job from the queue, and processing the print job through to the printer. A print server may service more than one queue and the queue may have more than one print server. The queue and the print server must be defined at the file server and information on the connection capabilities are stored by the file server. NWPrintServer provides encapsulation for the creation and destruction of NetWare print servers as well as keeping track of print server information and a list of available remote printers.

Responsibilities:
1. Creates and destroys the NetWare print server.
2. Maintains password settings for the NetWare print server.
3. Retrieves and modifies the list of NetWare servers to which the print server is attached.
4. Retrieves and modifies the list of NetWare printers which are servicing the print server.
5. Retrieves and modifies the list of NetWare printers defined to service the print server.
6. Retrieves and modifies the list of print queues which are serviced by the print server.
7. Retrieves and modifies the notification lists for the print server.
8. Creates and destroys NWPrinter objects.
9. Maintains print server information including name, connection type, SPX identification, and access privilege, among other things.

Collaborations:
1. Creates and destroys NWPrinter objects corresponding to NetWare printers which are servicing the physical NetWare print server.
2. Causes connections to NWQueue to allow the print server to service print jobs off the queue.

printServers—This is the instantiated class list of NWPrintServer objects which NWServer employs to maintain a valid list of print servers. This class is derived from a parameterized class which behaves like a hash set.

NWQueue—This classification is responsible for maintaining NetWare queue information. The creation and destruction of NWQueue causes the corresponding creation and destruction of the physical definition of a NetWare print queue. NWQueue maintain a list of queue print jobs, owner user names and operator user names. Like all model objects, NWQueue is derived from OVModel. Updated information is retrieved by NWQueue during the OVNetwork TICK period for all objects which have registered views.

Responsibilities:
1. Creates and destroys NetWare print queues.
2. Provides a polling mechanism used during the OVNetwork TICK period which uncovers new information about the print queue, which determines what print jobs exist, and which determines if NWQueueJob must be created.
3. Maintains a list of current print jobs (NWQueueJob).
4. Maintains a list of NetWare print servers (NWPrintServer) that are defined to attach and service the queue.
5. Maintains a list of users (NWUser) which are defined to have access to submit print jobs.
6. Maintains a list of users (NWUser) which are defined to have access to operate the print queue.

7. Maintains the queue name, volume error, connection type, and NetWare queue status.
8. Maintains NetWare queue status (i.e, can't add jobs, server can't attach, can't service jobs, etc.).

Collaborations:
1. Provides information to let NWPrintServer objects attach to NWQueue.
2. Allows OVNetwork to create NWQueue objects when they are discovered during the TICK period.
3. Allows NWUser objects to be added for users or operators of the queues.
4. Maintains a reference for the NetWare server which maintains the NetWare print queue.

queueList—This is the instantiated class list of NWQueue objects, and is employed by NWServer to maintain a valid list of NetWare print queues. This class is derived from a parameterized class which behaves like a hast set.

NWAttachment—This classification is responsible for maintaining the attachment information between a client station and a NetWare server. If such an attachment does not exist, then NWServer has an empty data member. If the workstation wishes to create an attachment to a NetWare server, NWAttachment is created and referenced by the NWServer data member. There is only one possible NWAttachment for each NWServer.

Responsibilities:
1. Maintains connection information, connection number, connection type, connection id, connection handle, name, and privilege information.
2. Creates a physical connection with a NetWare server by accessing appropriate API function calls.
3. Cleanly terminates the physical connection with the NetWare server. This is done by accessing the appropriate API function calls.

Collaborations:
1. Created and linked with NWServer if there is a physical attachment with the NetWare server.

Figure 8:
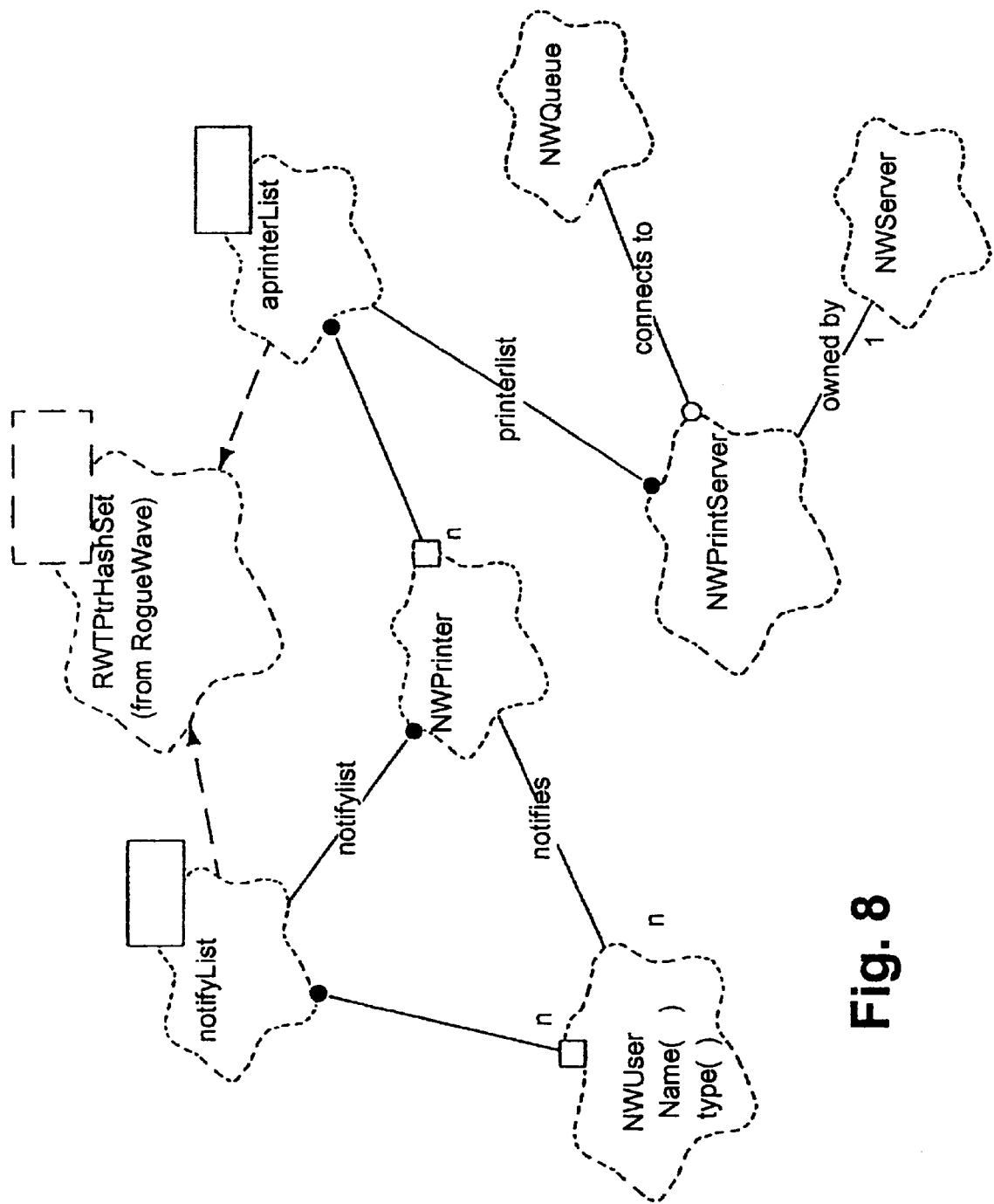
FIG. 8 is an OOA&D classification diagram showing the relationships of the print server in accordance with the preferred embodiment of the present invention.

FIG. 8 outlines the NWPrintServer and NWPrinter implementation employed by the preferred embodiment of the present invention. In describing this diagram the Grady Booch Object-Oriented Analysis and Design methodology is used. The classes as they appear in FIG. 8 and their relationships will now be discussed.

NWPrinter—This classification represents the NetWare remote printer definition, which is employed by print servers that do not reside on the physical printer devices. A remote printer is accessible through the network or is directly attached to a server running the print server application. The remote printer definition contains a description as well as a numeric identifier.

Responsibilities:
1. Creates and destroys NetWare printers for use by NetWare print servers.
2. Retrieves and maintains information about the NetWare printer, including identification, status, error codes, service mode, form number, form name, printer name, and printer description.
3. Maintains a notification list which includes-NWUser objects that are configured to be notified when a remote printer needs to report a fault condition.

Collaborations:
1. Stores a list of NWUser objects for notification purposes.
2. NWPrintServer stores a list of NWPrinter objects which is used by the NetWare print server when carrying out the print job request retrieved off the print queue.

aprinterList—This is the instantiated class list of NWPrinter objects maintained by NWPrintServer, and defines remote printers which are accessed by the print server. An application 10 creates and destroys remote printers by adding and removing them from aprinterList. This class is derived from a parameterized class which behaves like a hash set.

NWPrintServer—As was discussed above, this classification represents the NetWare print server.

notifyList—This is the instantiated class list of NWUser objects maintained by NWPrinter which require notification during a printer fault condition. This class is derived from a parameterized class which behaves like a hash set.

NWUser—As was discussed above, NWUser provides user information needed to contact a user of a remote printer fault.

NWQueue—As was discussed above, NWQueue provides queue information needed to determine the connection made between NWPrintServer and NWQueue.

NWServer—As was discussed above, NWServer provides server information needed to describe ownership of NWPrintServer.

Figure 9:
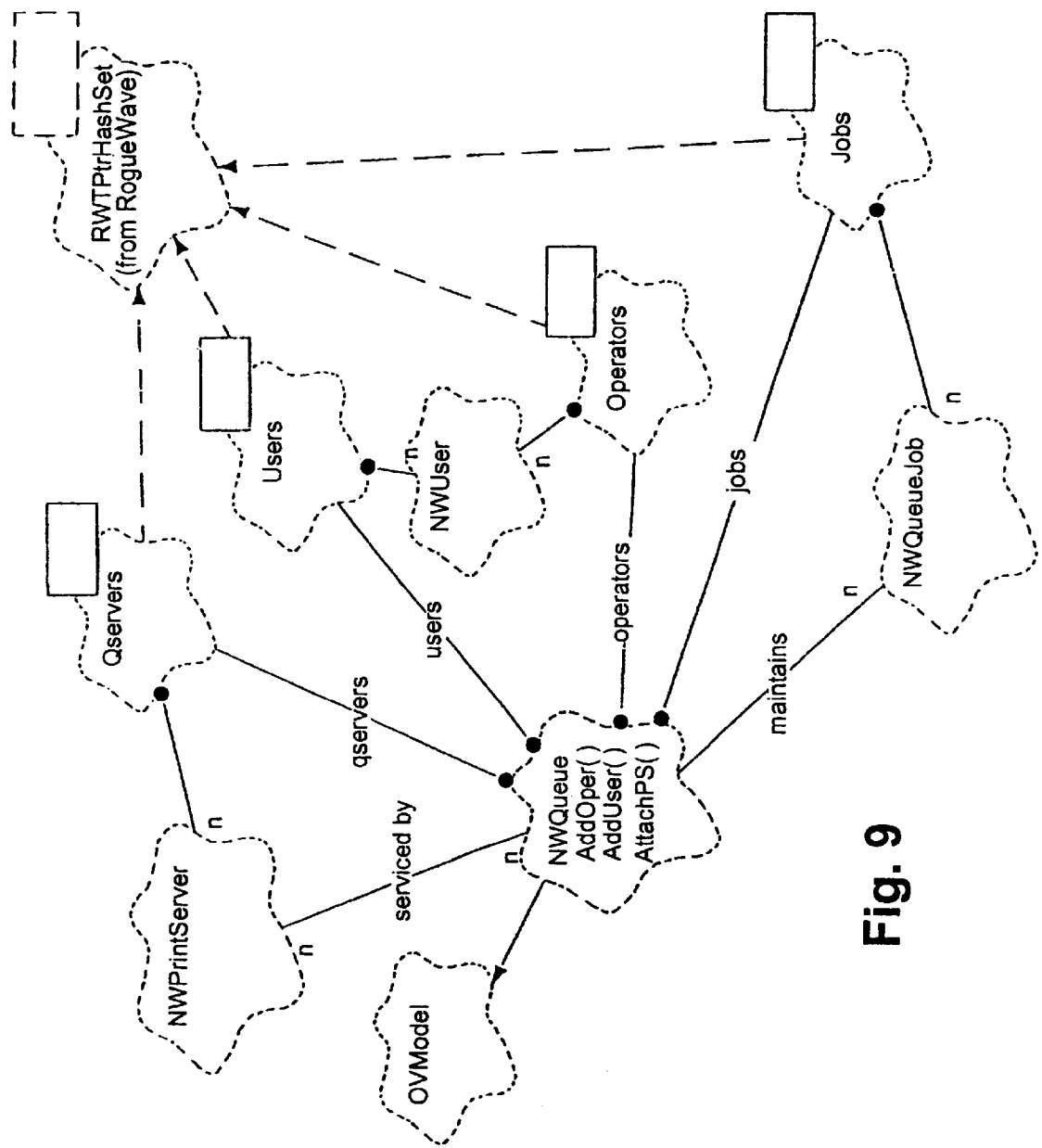
FIG. 9 is an OOA&D classification diagram showing the relationships of the queue in accordance with the preferred embodiment of the present invention.

FIG. 9 outlines the NWQueue implementation employed by the preferred embodiment of the present invention. In describing this diagram the Grady Booch Object-Oriented Analysis and Design methodology is used. The classes as they appear in FIG. 9 and their relationships will now be discussed.

NWQueue—As was discussed above, NWQueue models the workings of the NetWare print queue. As seen in FIG. 9, the queue contains several aggregate lists describing currently queued print jobs, attached print servers (Qservers), valid users, and valid operators. The queue also maintains the relationships between the print servers and the submitted jobs. The NWQueue inherits from the OVModel, and has intelligent updating capabilities. Updating occurs during the OVNetwork TICK period.

NWPrintServer—As was discussed above, NWPrintServer models a NetWare print server. The print server is responsible for processing print jobs located on NetWare queues. As seen, NWQueue is serviced by NWPrintServer.

Qservers—This is the instantiated class list of NWPrintServer objects, and is maintained by NWQueue. The list represents the NWPrintServers which are allowed or configured to service NWQueue. This class is derived from a parameterized class which behaves like a hash set.

NWQueueJob—This classification models the actual print jobs which reside in the queue, and is responsible for maintaining the information about the job and how the job is to be processed. As seen, NWQueue maintains and is responsible for the creation and destruction of NWQueueJob. NWQueueJob is stored by NWQueue into a Jobs instantiated class object, discussed below. NWQueueJob Information is updated by NWQueue during the OVNetwork TICK period.

Responsibilities:
1. Creates a print job and places the job on the print queue.
2. Destroys print jobs which are on the print queue and are completed.
3. Maintains file information on a queued print job.
4. Maintains the sequence of a print job on the queue and provides a mechanism for changing the job sequence.
5. Maintains job statistics including banner information, description, form information, and copy numbers, and allows for the changing of such job statistics.
6. Maintains job control information including auto start, entry hold, user hold, operator hold, and restart, and allows for setting such job control information where appropriate.

Collaborations:
1. Allows the NWQueueJob object to be listed in NWQueue.
2. Maintains a reference to NWQueue.
3. Allows for the creation and destruction of the NWQueueJob object from the NWQueue.

Jobs—This is the instantiated class list of NWQueueJob objects. The list is an aggregate of NWQueue and represents all print jobs which are currently contained by NWQueue. This class is derived from a parameterized class which behaves like a hash set.

NWUser—As was discussed above, NWUser models the NetWare user or user group. As seen in FIG. 9, NWQueue has two sets of NWUser objects, users and operators. For NetWare, a user is allowed to submit, modify, and remove the user's own print jobs freely, while an operator is allowed to submit, modify, and remove any print jobs freely. An operator is also allowed to configure a queue to allow print servers to attach and service print jobs. In the preferred embodiment of the present invention, NWUser objects which are users and operators are kept as aggregate lists to NWQueue. As users and operators are added, NWQueue is responsible for maintaining the User and operator objects shown.

Users—This is the instantiated class list of NWUser objects which are allowed to submit print jobs to NWQueue. This class is derived from a parameterized class which behaves like a hash set.

Operators—This is the instantiated class list of NWUser objects which are allowed to create, modify, or destroy any print job and are allowed to configure the queue to allow print servers to attach and service print jobs. This class is derived from a parameterized class which behaves like a hash set.

Figure 10:
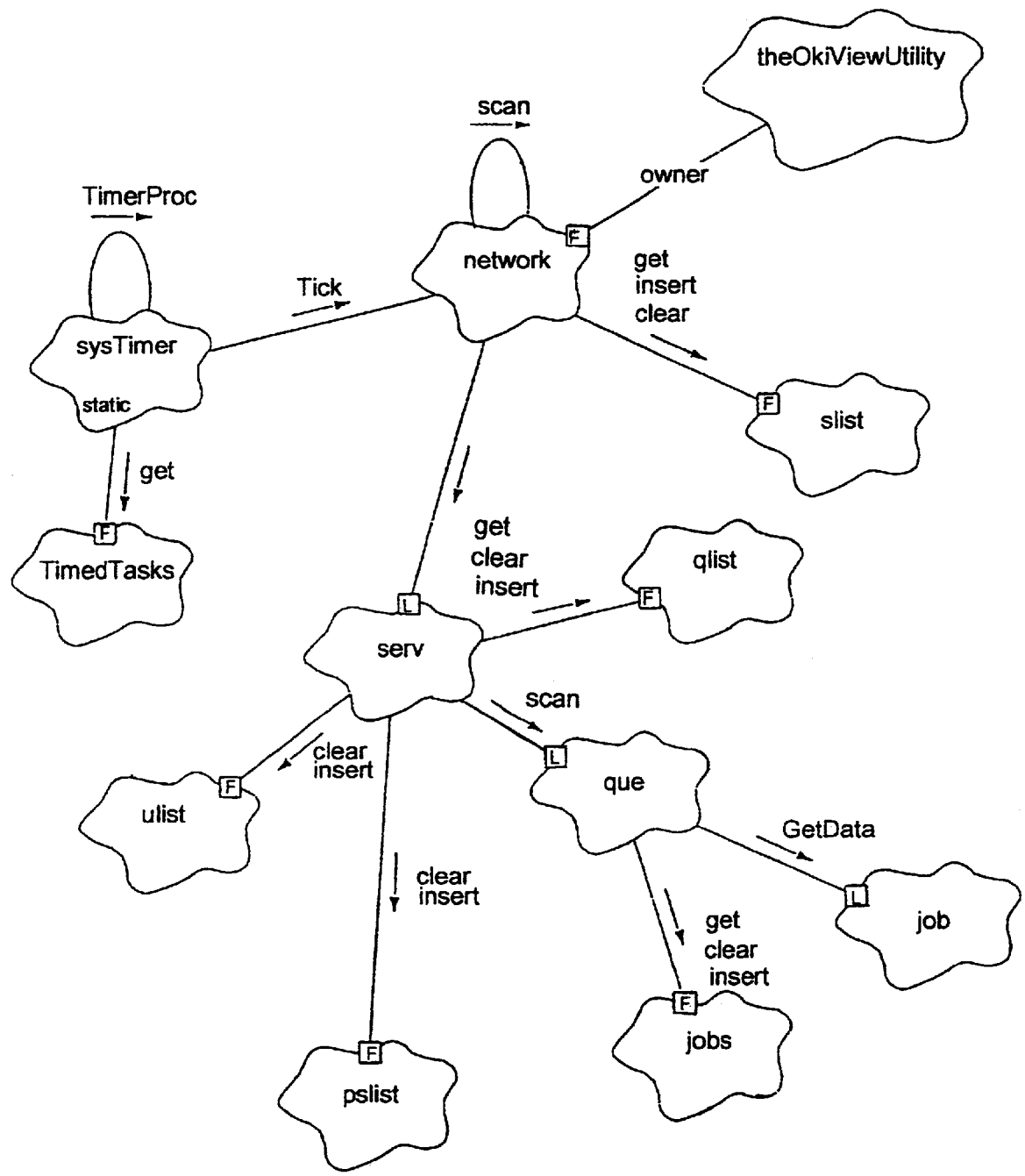
FIG. 10 is an OOA&D interaction diagram showing the process for updating network services in accordance with the preferred embodiment of the present invention.

FIG. 10 shows the interaction among objects for retrieving all information during the OVNetwork TICK period. The 'network' object is the instantiation of OVNetwork. As shown, the Timer object 'sysTimer' invokes the OVNetwork TICK method. The 'network' object then checks the serverList object 'slist' for an NWServer object which has an attachment. As should be understood, the 'slist' object is used to store all NetWare servers residing on the network.

When the 'network' object finds an attached NWServer object, it creates an object 'serv' which has local visibility to the 'network' object. When the 'serv' object is found, the 'network', object calls the NWServer 'scan' method to cause the NWServer object to search for new queues and to detect queues which have disappeared. All current queues are found and placed into a 'qlist' object, and the scan method then causes the NWServer object to serially fetch each NWQueue object and store that object into an NWQueue object 'que' which has local visibility only to the NWServer.

A call is then made to the NWQueue 'scan' method of the 'que' object. During the NWQueue scan, all the print job information is collected and stored in a Jobs object 'jobs'. The 'jobs' object has a locally visible copy of each NWQueueJob. Since NWQueueJob does not inherit any properties of OVModel, no scanning is performed on the 'job'.

After the NWServer is finished with all the NWQueue scan functions, the list of print servers is retrieved and stored in an aprinterList object 'pslist'. The NWPrintServer also does not inherit from OVModel so no scanning is performed on an NWPrintServer object. Although FIG. 10 shows the NWUser object 'ulist', the NWServer 'scan' method does not update the 'ulist' object. Instead, the 'ulist' object is constructed/reconstructed by any behavior of NWServer at the time it is needed.

Figure 11:
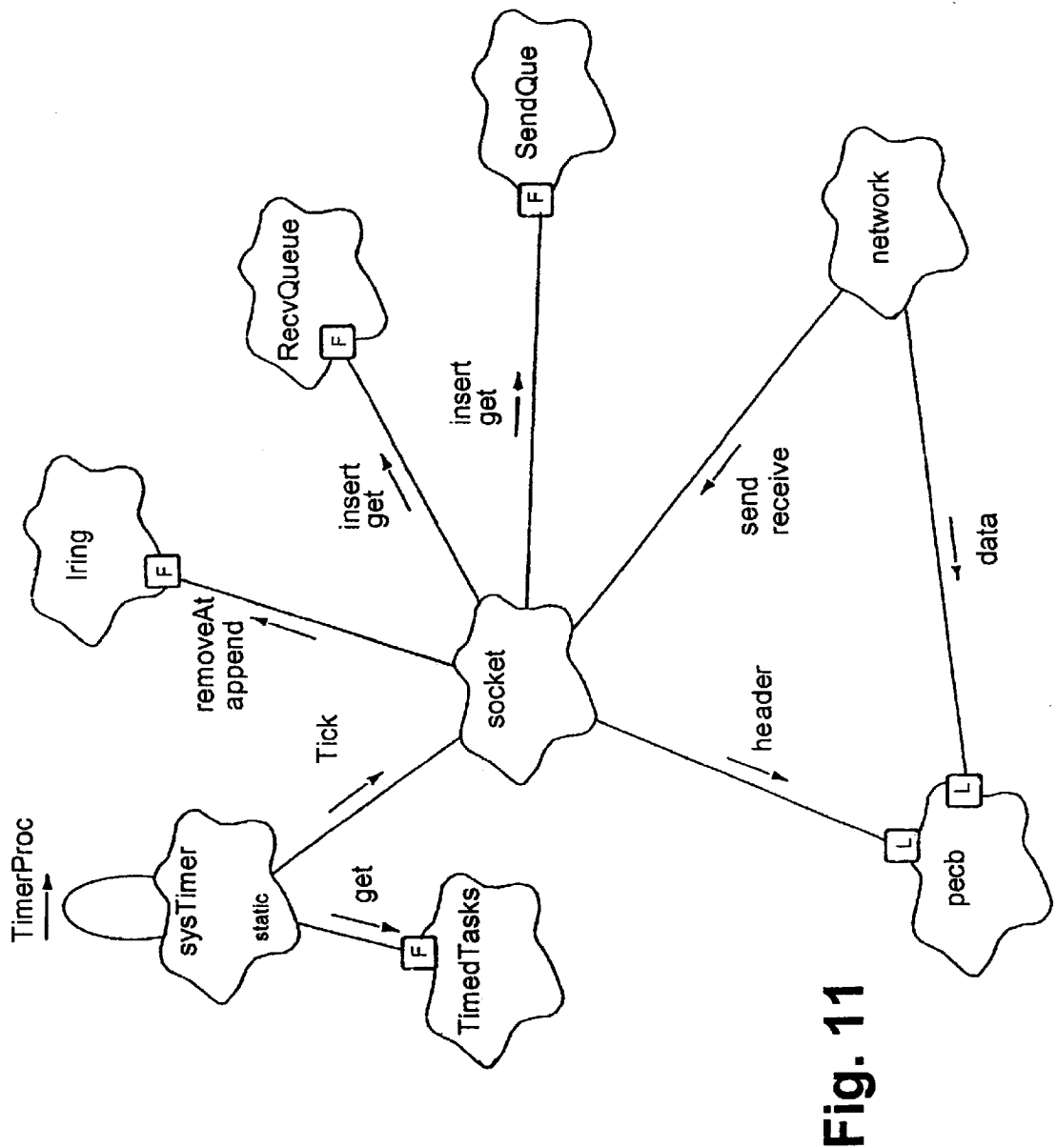
FIG. 11 is an OOA&D interaction diagram showing the process for maintaining communications through the network socket in accordance with the preferred embodiment of the present invention.

FIG. 11 shows the interaction among objects for maintaining the communication channels through the network sockets. The object 'socket' is the instantiation of NWSocket. As shown, the Timer object 'sysTimer' invokes the NWSocket TICK method. The 'socket' object then checks each ecb entry found in the ListenEcbs object 'Iring'. As should be understood, each ecb entry in 'Iring' is waiting for a new message from the network.

The 'socket' then creates an ecb object 'pecb' which has local visibility to 'socket' and holds each probed ecb object found in 'Iring'. If 'pecb' has received new information off the network, the relevant ecb object is added to the RecvEcbs object 'RecvQueue'. It is the responsibility of the OVNetwork object 'network' to retrieve the ecb objects from the 'RecvQueue' when the network is ready to access the new network information. The application 10 accesses new data through the NWSocket method 'receive'.

Next, 'socket' checks for any ecb objects which exist in the SendEcbs object 'SendQueue'. The ecb object is created by an application 10 and then submitted to 'SendQueue' through the NWSocket method 'send'. The ecb object is stored locally in pecb. If the ecb object is to be sent, the appropriate API calls are made. If the ecb object shows that is has been sent but is currently in an error state, an error condition is stored and the ecb object is destroyed.

Figure 12:
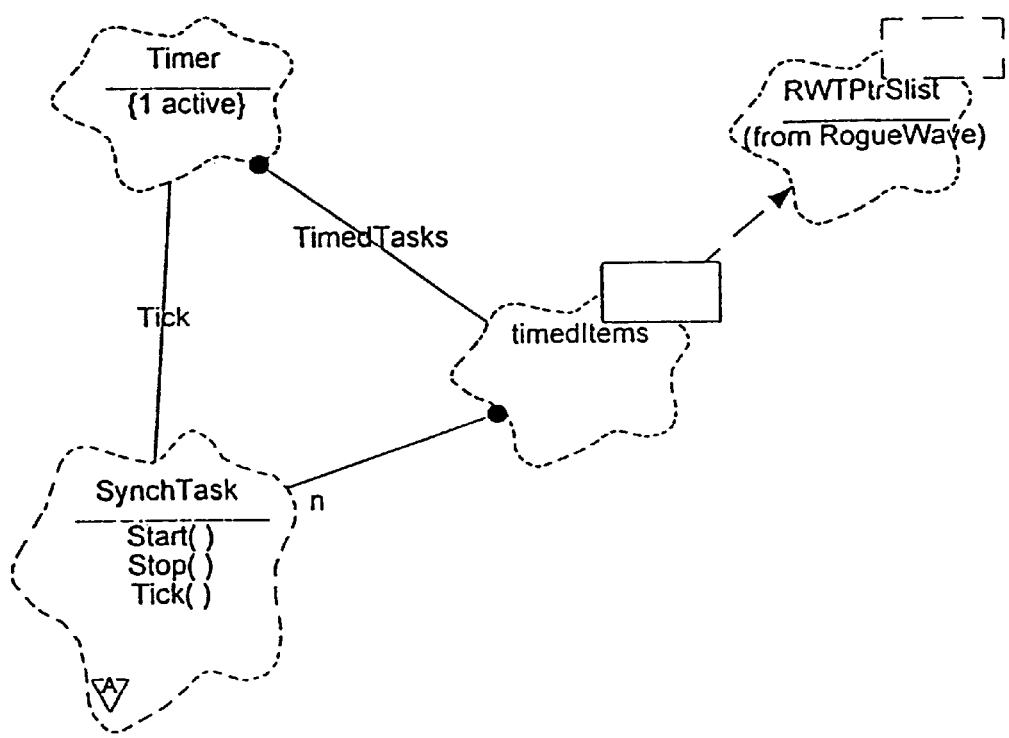
FIG. 12 is an OOA&D classification diagram showing the timer class relationships in accordance with the preferred embodiment of the present invention.

FIG. 12 outlines the classification implementation used for Timer and SynchTask in the preferred embodiment of the present invention and shows how the Timer object maintains a list of SynchTask type objects. As explained, these tasks are responsible for the synchronous behavior of the MVC.

Timer—As was discussed above, this class describes an object with the ability to wake up periodically. This class contains a list of objects of type SynchTask. The Timer interfaces with the operating system and provides a means for callback into a Timer method. This callback traverses the list of SynchTask objects and invokes the TICK method of each. A SynchTask object is registered with the Timer, i.e. stored in the list, during the construction of a SynchTask object. The registered object is cleared during the destruction of the SynchTask object.

SynchTask—As was discussed above, this class describes a task which is capable of periodically waking up and performing a single function called TICK. Any class which inherits this capability provides the TICK function.

timeditems—This is the instantiated class list of SynchTask objects which provide a TICK process for the Timer to invoke during a wake-up period. This class is derived from a parameterized class which behaves like a singly-linked list.

With the architecture described above, the preferred embodiment of the present invention is a computer network that includes at least one network client memory, a network operating system 11 executing in the network client memory for operating the computer network and for providing access to network services, and a network application 10 executing in the network client memory for performing an application function. The computer network also has a plurality of network devices 34 interfaced to the network operating system 11 and available to the network application 10 and the network operating system 11 for performing the network services.

Each network device 34 provides at least one specific network service and has an object component in the network client memory representative of the network device 34. Each object component includes an interface or API 18 such that the network application 10 is in direct communication with the interface 18 of each object component. Accordingly, the network application 10 communicates directly with each of the object components. The network application 10 need only communicate with a respective object component to request a respective network service, and the respective object component carries out all further communications necessary to have the requested network service performed.

Preferably, a network socket 36 is interfaced to the network operating system 11 and has a socket memory, and the computer network has a network application 10 executing in the socket memory for performing the application function. Preferably, the network device 34 is a printer for providing a printing service, a print server for providing a print server service, a print queue for performing a print queue service, a file server for providing a file server service, a network database for providing a network database service, a scanner for providing a scanner service, or the like.

With the system and method for encapsulating network service-related information and network devices 34 as was discussed above, an application 10 can request a service by virtually communicating directly with the appropriate network device or devices 34 that provides the requested service. It will be appreciated by those skilled in the art that changes could be made to the embodiments described above without departing from the broad inventive concepts thereof. It is understood, therefore, that this invention is not limited to the particular embodiment disclosed, but it is intended to cover modifications within the spirit and scope of the present invention as defined by the appended claims.

What is claimed is:

1. A computer network comprising:

a network client memory;

a network operating system executing in the network client memory for operating the computer network and for providing access to network services;

a network application executing in the network client memory for performing an application function;

a plurality of network devices interfaced to the network operating system and available to the network application and the network operating system for performing the network services, each network device for providing at least one specific network service and having an object component in the network client memory representative of the network device; and a network object obtaining service-related information about each network device and passing the service-related information to each network device object component, the object component periodically storing the service-related information about the network device, each object component including an interface, the network application being in direct communication with the interface of each object component such that the network application communicates directly with each of the object components, wherein the network application communicates with a respective object component to request a respective network service, the network service supported by the respective object component in the network client memory comprising at least one of configuring the network devices and providing the service-related information about the network devices and wherein the respective object component carries out all further communications necessary to have the requested network service performed.

2. The computer network of claim 1 further comprising a network socket executing in the network client memory and interfaced to the network operating system, the network socket having a socket memory, the computer network comprising the network application executing in the socket memory for performing the application function.

3. The computer network of claim 1 wherein at least one of the network devices is selected from a group consisting of a printer for providing a printing service, a print server for providing a print server service, a print queue for performing a print queue service, a file server for providing a file server service, a network database for providing a network database service, and a scanner for providing a scanner service.

4. In a computer network, a method for a network application to request network services, the method comprising the steps of:

providing a network client memory;

executing a network operating system in the network client memory to operate the computer network and to provide access to the network services;

executing the network application in the network client memory to perform an application function;

interfacing a plurality of network devices to the network operating system and making the network devices available to the network application and the network operating system to perform the network services, each network device for providing at least one specific network service;

providing an object component for each network device in the network client memory, the object component being representative of the network device;

obtaining service-related information about each network device by a network object and passing the service-related information to each network device object component;

periodically storing the network service-related information about the network device in each network device object component, each object component including an interface;

communicating, by the network application, directly with one of the object components by way of the respective interface to request a respective network service, the respective network service supported by the object component in the network client memory comprising at least one of configuring the network devices and providing the service-related information about the network devices; and issuing, by the communicated-with object component, all further communications necessary to have the requested network service performed.

5. The method of claim 4 wherein the computer network includes a network socket executing in the network client memory and interfaced to the network operating system, the network socket having a socket memory, the executing the network application step comprising the step of executing the network application in the socket memory for performing the application function.

6. The computer network of claim 4 wherein the interfacing a plurality of network devices step further comprises the step of interfacing a plurality of network devices, at least one of the network devices being selected from a group consisting of a printer for providing a printing service, a print server for providing a print server service, a print queue for performing a print queue service, a file server for providing a file server service, a network database for providing a network database service, and a scanner for providing a scanner service.

* * * * *